Patented Oct. 22, 1940

2,218,782

UNITED STATES PATENT OFFICE 2,218,782

ABRASIVE ARTICLE

Carl E. Barnes, Worcester, Mass., assignor to Norton Company, Worcester, Mass., a corporation of Massachusetts No Drawing. Application March 19, 1938, Serial No. 197,035

5 Claims. (Cl. 51—298)

This invention relates to abrasive articles and more particularly to such articles made of abrasive grains cemented together by synthetic resin bonds.

Grinding wheels and other abrasive articles are customarily made of abrasive grains bonded by a resinoid, such as phenolformaldehyde condensation product. Grinding wheels of this type are often subjected to heavy duty grinding operations which generate a considerable amount of frictional heat, and it is desirable that such a bond be resistant to the normal grinding temperatures and that it have a high degree of strength and be capable of tenaciously adhering to the grains and forming a bonded body of sufficient strength to withstand the disruptive stresses set up by centrifugal force and expansion within the wheel due to generated heat.

A primary object of this invention is to satisfy the above requirements and to provide an organic bond for abrasive grains which is highly resistant to heat, of great strength, infusible and durable under normal conditions of a grinding operation. Further objects will be apparent in the following disclosure.

It is found that styrene ($C_6H_5$—$CH$=$CH_2$) is capable of being polymerized in the presence of abrasive grains to form a bond therefor. But the product is not infusible or sufficiently resistant to the heat of a grinding operation since it is softened at a temperature of about 80° C. Moreover, when styrene is polymerized by itself and with the aid of suitable catalysts, such as benzoyl peroxide, the polymerization reaction is comparatively slow and may take from one to two weeks of time at a temperature of 50° C. Therefore, even if styrene in its polymerized form could act as a satisfactory bond yet it would not be economical to employ it because of its tying up expensive molds and heating apparatus for the long time required to polymerize the material.

I have discovered that styrene in its monomeric form may be copolymerized with acrylic acid, alpha chloro-acrylic acid and alpha methyl acrylic acid and that the resultant product is satisfactory for use as an abrasive bond and may be economically manufactured. These two polymerizable substances may be mixed and copolymerized in all desired proportions; but I prefer that the substances be used only in those amounts wherein the one is soluble in the other so that the final copolymerized product will be homogeneous and not comprise an intermixture of separately polymerized substances.

The acrylic acid, alpha chloro-acrylic acid and methacrylic acid have the property of hastening or activating the polymerization of styrene to such an extent that the final product may be made in an economically short period of time. For example, if styrene is mixed with 25% by volume of methacrylic acid and with a suitable catalyst such as 0.02% by weight of benzoyl peroxide, this intermixture polymerizes in 12 hours' time at a temperature of 50° C. to a hard and heat resistant condition. This product will not soften at any normal temperature involved in a grinding operation and in fact, it will resist the ordinary grinding temperatures.

An abrasive article may, therefore, be made of abrasive grains bonded by a synthetic resin containing styrene copolymerized with a substance selected from the group consisting of acrylic acid, alpha chloro-acrylic acid and methacrylic acid. Various types of abrasive grains, such as crystalline alumina, silicon carbide, boron carbide and diamonds may be bonded by these synthetic resins and the grains and bond may be employed in any desired proportions. As examples of suitable bonds, I may employ styrene in suitable intermixture with acrylic acid, alpha chloro-acrylic acid or methacrylic acid.

As an example of one method of forming an abrasive article, such as a grinding wheel, I may bond the abrasive grains with styrene and an activator, such as acrylic acid, alpha chloroacrylic acid or methacrylic acid, in their monomeric liquid conditions. The abrasive grains may be placed in a mold in suitable amount and the monomeric substances to be copolymerized are poured over the grains in their liquid polymerizable condition and thereafter hardened in place by the application of heat and pressure, if desired. The bond may be made, for example, of 75% of styrene mixed with 25% of methacrylic acid, together with 0.02% of the catalyst benzoyl peroxide. Various other materials may be incorporated in the bond and grain mixture. One may use fillers of the nature of sand or any other inert substance that does not adversely affect the polymerization process. The grade of hardness and the structure may be controlled by suitable variation of the amounts of the materials. We may, for example, use 1,656 grams of crystalline alumina abrasive with 365 cubic centimeters of the bond mixture of which 75% is styrene and 25% is methacrylic acid. A suitable catalyst may be added. The abrasive material may be placed in a mold and the liquid monomers poured thereover. The mold may be of any suitable construction, such as a hollow body provided with a cover plate. The mold and contents are heated to a temperature of about 50° C. for a period of about twelve hours. This causes the bond to set as a hard and infusible material which adheres to the abrasive grains and holds them rigidly in position and thus forms an article of satisfactory abrasive characteristics.

Another method of making an abrasive article involves mixing the two monmeric liquids, styrene and one of the above mentioned polymerizable acids and then subjecting the liquid mixture to a temperature of about 50° C. or higher for a sufficient length of time to cause them to harden. This hard mass is then crushed to a granular or a powdered condition and preferably to a size which is smaller than that of the abrasive grains to be bonded thereby. Then the grains are mixed with this resin powder and preferably after the grains have been wetted with the polymerizable bond in its monomeric form or with either one of the monomeric bond substances or with any suitable liquid so that the grains will readily stick to the already polymerized bond particles. Thereafter the intermixture is heated in a mold at a temperature at which the bond is soft, such as about 150° C., and subjected to a suitable pressure, such as 3 tons per square inch, which is required to form the desired structure. The temperature involved is that at which the polymerized product will soften.

An article thus made of styrene mixed with acrylic acid, alpha chloro-acrylic acid or methacrylic acid comprises a bond which is very hard and has a high tensile strength and resists the disruptive forces of a grinding operation. The bond will not soften at temperatures ordinarily met in grinding and so will serve many useful purposes. It is to be understood that the above matter is to be interpreted as illustrative of the invention and not as limiting it to the methods and materials above specified and that the claims are to be interpreted broadly within the scope of my invention. The methods of making abrasive articles as above described are claimed in my copending applications Serial Numbers 187,549, filed January 28, 1938; 228,004, filed September 1, 1938; and 316,212, filed January 29, 1940.

What I claim is new and desire to secure by Letters Patent is:

1. An abrasive article comprising abrasive grains bonded by a synthetic resin containing styrene as the primary ingredient copolymerized with a substance of the group consisting of acrylic acid, alpha chloro-arcylic acid and methacrylic acid.

2. An abrasive article comprising abrasive grains bonded by styrene copolymerized with acrylic acid.

3. An abrasive article comprising abrasive grains bonded by styrene copolymerized with methacrylic acid.

4. An abrasive article comprising abrasive grains bonded by styrene copolymerized with alpha chloro-acrylic acid.

5. An abrasive article comprising abrasive grains bonded by a polymerized substance containing at least 50% of styrene copolymerized with a polymerizable substance of the group consisting of acrylic acid, alpha chloro-acrylic acid and methacrylic acid, which are capable of and proportioned for forming a hard resin that is not soft at the normal grinding temperatures and may be copolymerized at a temperature of 55° C. within 24 hours.

CARL E. BARNES.